May 13, 1969 W. L. ACKER ET AL 3,443,827

CONNECTOR ASSEMBLY FOR AXIALLY CONNECTING RODS AND TUBING

Filed Oct. 21, 1966

INVENTORS
WILLIAM L. ACKER
PETER BOEZI

BY Beale and Jones
ATTORNEYS

United States Patent Office 3,443,827
Patented May 13, 1969

3,443,827
CONNECTOR ASSEMBLY FOR AXIALLY CONNECTING RODS AND TUBING
William L. Acker, P.O. Box 47, La Plume, Pa. 18440, and Peter Boezi, R.D. 2, Box 178A, Moscow, Pa. 18444
Filed Oct. 21, 1966, Ser. No. 588,524
Int. Cl. F16l 33/00, 35/00, 55/00
U.S. Cl. 285—39     3 Claims

ABSTRACT OF THE DISCLOSURE

A connector assembly for a rod or a tube where one tube or rod has an affixed peripheral collar that protrudes beyond the tube or rod and is cut away axially in diametrical portions. The protruding collar portion of this rod or tube receives another tube or rod in abutment thereto that has a peripheral collar cut away in diametrically opposite portions so that they receive the protruding portions of the other members collar. In the protruding portions, there are cutaway portions that receive keeper pieces. The tubes or rods are of ferrous material and the keepers fitting in the cutaway portions are magnetic pieces and are held in place by magnetic attraction. There are suitable voids in the collar portions that provide for the insertion of a tool so as to pry one member away from another member as may be necessary after removal of the keepers.

---

This invention relates to improvements in connectors for rods and tubing.

An object of the invention is to provide a connector for rods and tubing that may be attached to the ends of two such pieces to be connected axially wherein the pieces and connector are slid axially together and held together by a removable locking piece received in the connector.

A further object of the invention is to provide two complementary sleeve members for attachment to rods or tubing, each sleeve member having at least one axially cutaway portion of its wall permitting the wall of one to be axially received within the cutaway portion of the other, the walls adjoining having a circumferentially extending recess therein that receives a removable locking piece.

Another object of the invention is to provide a connector for axially connecting tubular or rod members wherein the connector has two generally complementary sleeves adapted to be respectively fixed to the pieces to be axially connected, each sleeve having an axially extending recess receiving an axially extending projection on the other sleeve and each sleeve having a circumferentially extending adjoining recess in adjacent projections that receives therein a removable locking piece held magnetically in place that prevents separation of the connector sleeves.

For a more complete understanding of the invention reference is had to be drawings in which.

Throughout the description like reference numbers refer to similar parts.

Figure 1:
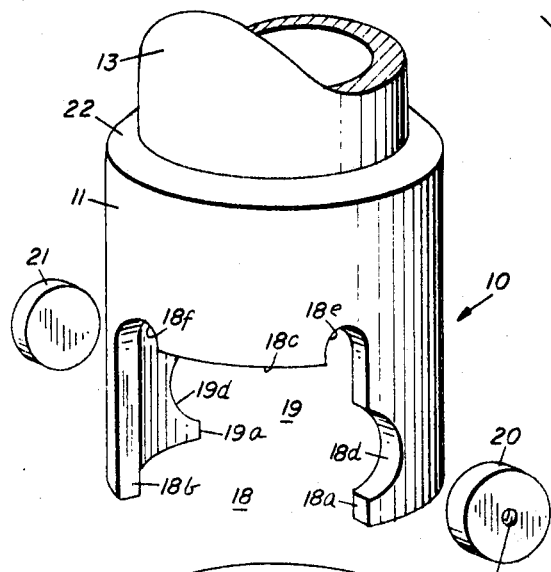
FIG. 1 is an exploded perspective view of the connector.

A connector according to the invention is generally indicated at 10. It comprises two generally complementary sleeve members 11 and 12 for attachment respectively to the ends of tubes or rods 13 and 14 to be coupled together axially. The members 13 and 14 are here shown as tubular members by way of illustration. Sleeve members 11 and 12 could equally as well be attached to the ends of rods or one to a rod and one to a tubular member.

Sleeve member 12 will be described. The sleeve member 12 has two oppositely disposed cutaway portions 15 and 16 extending axially in its wall for about two-thirds its length from top towards the bottom end thereby forming parallel and axially extending wall edges 15a and 15b and 16a (not shown) and 16b. These cutaway portions terminate in bottom faces 15c and 16c in the wall. In the projecting wall portions of sleeve 12 there is provided circumferentially extending semicircular recesses 15d and 16d (not shown) that extend in from the sleeve wall edges 15b and 16c. The sleeve 12 is concentrically received over the end of tubular member 14 which projects above the upper end of sleeve 12 a short distance at 14a. The sleeve 12 is attached to the tube 14 as a welding at 17. The projecting upper end portion 14a of tube 14 is received slidably within the sleeve member 11.

Figure 2:
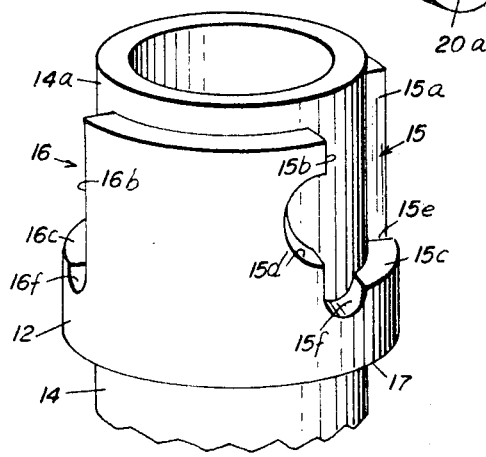
FIG. 2 is a side elevation of the connector assembled.
Figure 2:
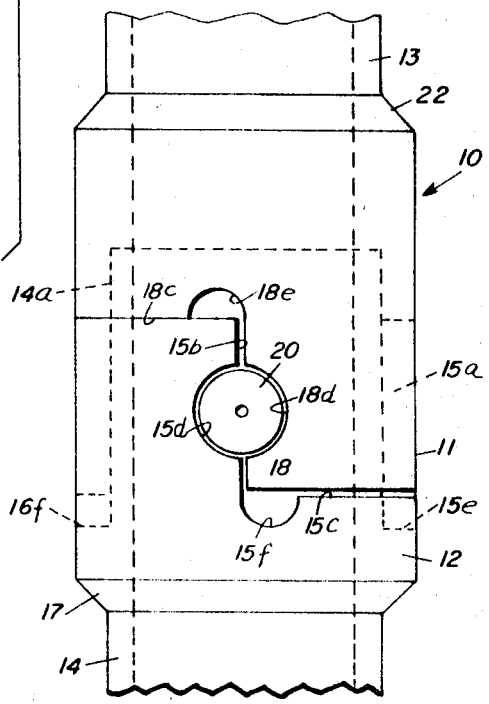
Figure 3:
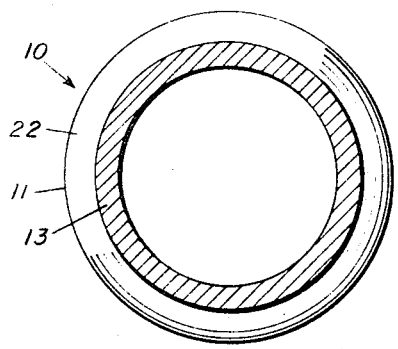
FIG. 3 is a bottom end view of the connector shown in FIGS. 1 and 2.

Sleeve member 11 is complementary to sleeve member 12 and has cutaway portions which have respective axially extending wall edges 18a and 18b and 19a and 19b (not shown). Circumferentially extending simicircular recesses 18d and 19d are formed in the projecting wall portions of the sleeve 11 and are positioned so as to be complementary to the like recesses in sleeve 12. Within the complementary adjacent recesses 15d and 18d and 16d and 19d that form composite circular recesses there is received respective locking circular pieces 20 and 21. These locking pieces 20 and 21 have magnets therein so that they are removably held in locking position when the sleeves are slidably received together as shown in FIG. 2.

The locking pieces 20 and 21 may have their exposed faces drilled and tapped as shown at 20a for piece 20 to receive a screw to provide for more easy removal. The recesses for these locking pieces and the locking pieces may have other shapes than here shown.

The sleeve 11 receives concentrically therein the end of tubular member 13 which may be secured by welding at 22.

Axially extending recesses 15e and 15f are formed in the wall of sleeve 12 at the bottom of wall edges 15a and 15b, respectively. Axially extending recesses 16e and 16f are likewise respectively formed at the bottom of wall edges 16a and 16b.

Similarly there is formed at the inward end of wall edges 18a and 18b axially extending recesses 18e and 18f. In a similar manner recesses (not shown) are formed in the inward end of wall edges 19a and 19b. These just described recesses provide voids for insertion of a tool to urge the sleeve members 11 and 12 axially apart for uncoupling the connector.

What is claimed as the invention is:

1. A connector assembly for axially connecting rods and tubing that may be secured thereto, in combination, a first tubular-like sleeve member having an axially extending cutaway portion of its wall extending from one end for an appreciable axial length thereof, thereby leaving a wall having axially extending circumferentially spaced-apart wall edges, said wall edges being connected by a circumferentially extending portion of said sleeve member, at least one of said wall edges having a circumferentially extending recess extending thereinto, said recess having axially spaced walls, a second tubular-like sleeve member complementary to said first member having its wall portion axially slidably received within said axially extending cutaway wall portion of said first member, said second member having its circumferentially extending complementary recess in one of its wall edges adjacent said circumferentially extending recess in the first member, and a removable locking piece of a size to substantially fill said adjacently positioned recesses received in said adjacently positioned recesses whereby said first and second tubular-like sleeve members are locked together preventing separation from each other, at least one of said tubular-like sleeve members having ferrous material at least adjacent said circumferentially extending recess in a wall edge thereof and said removable locking piece has a permanent magnet portion cooperating with said ferrous material to hold said locking piece in locking position, said magnet portion being the sole means of holding said locking piece in said locking position.

2. A connector assembly according to claim 1 wherein said first tubular-like member has an inner sleeve portion contiguous therewithin and the inside wall surface of said second member wall is proximate to the adjacent outer surface of said inner sleeve portion on the first member.

3. A connector assembly according to claim 1 wherein the first and second tubular-like members have axially extending and oppositely disposed recesses in the walls thereof formed substantially at the juncture of one said one edge and said circumferentially connected portion.

References Cited

UNITED STATES PATENTS

| | | | |
|---|---|---|---|
| 967,395 | 8/1910 | Langhaar | 285—330 X |
| 2,107,238 | 2/1938 | Des Roches | 287—103 |
| 2,389,298 | 11/1945 | Ellis | 24—201.2 |
| 2,398,570 | 4/1946 | Wildhaber | 287—103 X |
| 2,606,413 | 8/1952 | Gray | 287—103 X |
| 2,893,694 | 7/1959 | Waggener | 285—39 |
| 2,912,263 | 11/1959 | Christy | 285—9 X |
| 3,104,896 | 9/1963 | Kennedy | 285—18 |
| 3,253,842 | 5/1966 | Rabe | 285—81 |

FOREIGN PATENTS 1,398,943 4/1965 France.

CARL W. TOMLIN, *Primary Examiner.*

DAVE W. AROLA, *Assistant Examiner.*

U.S. Cl. X.R.

24—201.2; 285—81, 305, 330, 403